United States Patent [19]
Hauser et al.

[11] Patent Number: 4,734,602
[45] Date of Patent: Mar. 29, 1988

[54] MOTOR PROTECTOR RECEPTACLE FOR A REFRIGERATION COMPRESSOR

[75] Inventors: Bret R. Hauser, Larue; Thomas E. Jensen, Tyler, both of Tex.

[73] Assignee: American Standard Inc., New York, N.Y.

[21] Appl. No.: 18,309

[22] Filed: Feb. 24, 1987

[51] Int. Cl.$^4$ ............................................. H02K 11/00
[52] U.S. Cl. ..................................... 310/68 C; 361/25; 318/473; 337/372; 337/380
[58] Field of Search ...................... 310/68 R, 68 C, 71; 361/22, 24, 25, 26, 27, 28, 29, 31, 106; 318/784–786, 788, 791, 792, 473; 174/52 R, 138 G; 337/372–380, 414

[56] References Cited

U.S. PATENT DOCUMENTS

| | | | |
|---|---|---|---|
| 2,523,059 | 9/1950 | Richert et al. | 310/68 C |
| 4,045,761 | 8/1977 | Peterson | 310/68 C X |
| 4,061,935 | 12/1977 | Kandpal | 310/68 C |
| 4,163,913 | 8/1979 | Barratt | 310/91 |
| 4,236,092 | 11/1980 | DiFlora | 310/68 |
| 4,308,517 | 12/1981 | Peterson | 310/68 C X |
| 4,499,517 | 2/1985 | Lisauskas | 310/68 C X |
| 4,503,347 | 3/1985 | Bergman | 310/68 |
| 4,567,390 | 1/1986 | Stewart | 310/68 |
| 4,571,517 | 2/1986 | Chastine | 310/68 C |
| 4,620,425 | 11/1986 | O'Grady | 310/68 C X |
| 4,641,121 | 2/1987 | Boulanger | 310/68 C X |

Primary Examiner—Mark O. Budd
Attorney, Agent, or Firm—William J. Beres; Robert J. Harter; David L. Polsley

[57] ABSTRACT

A device for mounting a thermal overload protector to the motor of a hermetic refrigeration compressor. The overload protector is temperature responsive and is operative to protectively interrupt the current to the motor when the stator windings, rotor, or other heat source in the compressor overheats due to a compressor overload. The protector's mounting device is a plastic receptacle having a shield connected by an integral hinge. The hinge not only facilitates manufacturing the receptacle as a unitary part by an injection molding process, but also enables the shield to be opened for inserting the overload protector into the receptacle. The overload protector is held firmly in place by a U-shaped bracket integrally disposed inside the receptacle. A U-shaped groove runs along the inner edge of the bracket and is designed to slidingly engage protectors of various shapes. The receptacle includes an opening on one side of the protector opposite the heat retaining shield. The receptacle is mounted so that the opening exposes the overload protector to the heat source while the shield traps heated refrigerant around the overload protector and also helps minimize heat loss from the protector, thus improving its response to heat resulting from overload.

19 Claims, 5 Drawing Figures

MOTOR PROTECTOR RECEPTACLE FOR A REFRIGERATION COMPRESSOR

TECHNICAL FIELD

This invention generally pertains to a thermal overload device for a refrigeration compressor and specifically pertains to a receptacle for holding the thermal overload device near the motor contained within the hermetic shell of the refrigeration compressor.

BACKGROUND OF THE INVENTION

In a hermetic refrigeration compressor, the motor is often protected by a temperature responsive overload protector. The protector is typically mounted within or against the stator and interrupts the supply current to the motor in response to its temperature rising to a predetermined limit.

When the overload protector is mounted against the stator, an electrically insulating material is typically provided to separate the protector from the stator to avoid direct electrical contact therebetween. This same electrically insulating material, however, also acts as a thermal insulator that reduces the effectiveness of the protector. U.S. Pat. Nos. 4,163,913; 4,236,092; 4,503,347; and 4,567,390 disclose this insulating material as denoted by reference numerals 30, 54, 52, and 50 respectively.

In addition, a close fit between the mating surfaces of the protector and the stator becomes critical when the overload protector is mounted against the stator. A poor fit, often caused by human error during assembly, affects the heat transfer to the protector which may result in inadequate protection of the compressor. Moreover, the close fit requirement often limits the selection of temperature sensors to those having flat surfaces that correspond to certain flat surfaces of the stator, thus limiting the choice of mounting locations within the compressor.

Another problem associated with overload protectors mounted within the hermetic shell of a refrigeration compressor is the protector's exposure to cold suction gas and other relatively cold compressor components. The cooler surroundings within the compressor shell tend to lower the temperature of the protector and thus reduce its sensitivity to heat generated by the stator. Of the four patents mentioned above, only the '347 patent comes close to addressing this problem. The '347 patent discloses an abutment post 78 which protectively stands between the temperature sensor and a relative cold cover 44. None of the four patents disclose an overload protector receptacle having a heat retaining shield facing in a direction opposite the stator.

Therefore, it is an object of this invention to provide an overload protector receptacle that shields its temperature responsive protector from cold suction gas and other relatively cold parts of the compressor.

Another object is to provide a receptacle that includes a heat retaining shield that traps heated refrigerant around the overload protector, thereby eliminating the need for close fitting contact between the overload protector and the stator.

Another object is to provide a receptacle that can position an overload protector in a variety of positions, including over the axial end of the rotor.

Yet another object is to provide a receptacle adapted to hold a variety of overload protectors having various shapes.

These and other objects will be apparent from the attached drawings and the description of the preferred embodiments that follow below.

SUMMARY OF THE INVENTION

The subject invention is a device for mounting a motor overload protector inside the hermetic shell of a refrigeration compressor. The mounting device includes a receptacle adapted to hold the overload protector near a heat source, such as a stator or a rotor. The receptacle includes a heat retaining shield that not only traps heated refrigerant around the overload protector, but also shelters the protector from heat absorbing surroundings, such as cool suction gas and cool compressor components.

DESCRIPTION OF THE PREFERRED EMBODIMENT

Figure 1:
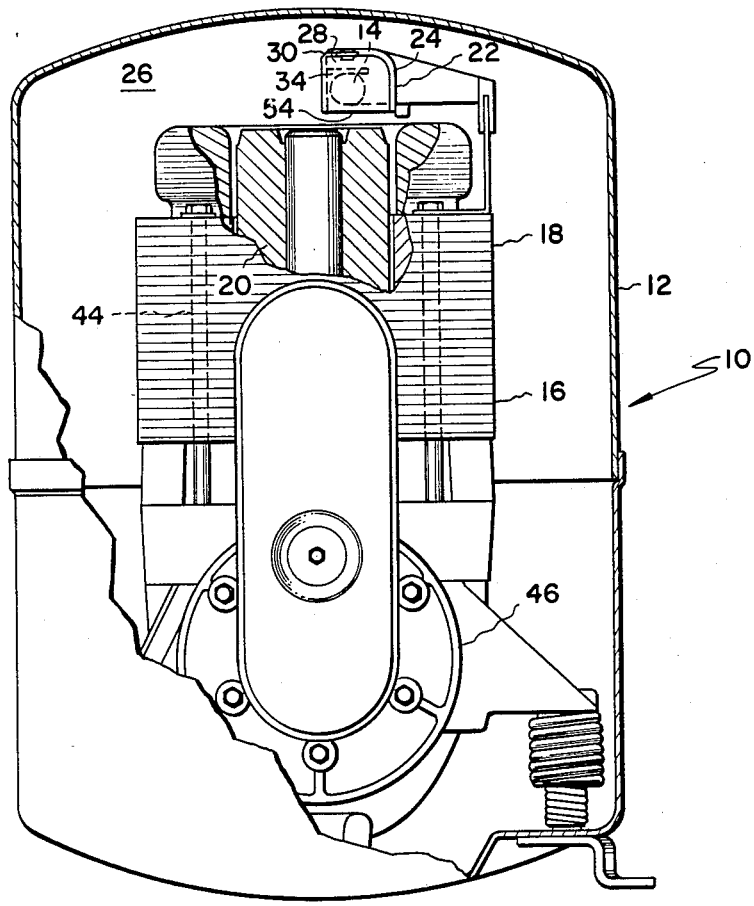
FIG. 1 is a cutaway view of the compressor showing the receptacle holding the overload protector over the axial end of the rotor.

In FIG. 1, a refrigeration compressor 10, contained within a hermetic shell 12, is shown with an overload protector 14 installed to protect against motor overload. Protector 14 is both a current and a temperature responsive switch that protectively interrupts the current to a compressor motor 16 upon sensing either a predetermined unsafe temperature of a heat source such as a stator 18 and rotor 20 or sensing an excessive supply of current through the stator windings of motor 16. The actual current and temperature levels that trip the switch open depends on the specific motor protector, which is selected to match the operating characteristics of the protected motor.

A receptacle 22 holds overload protector 14 over the axial end of rotor 20 and shelters protector 14 with heat retaining shields 24. Heat retaining shields 24 are any side wall of receptacle 22 that protects overload protector 14 from cold suction gas 26 or relatively cool adjacent surfaces such as compressor shell 12. Shields 24 are also used to collect rising refrigerant gas heated by both rotor 20 and stator 16 and help trap the heated gas around protector 14 in the space denoted by numeral 28.

In the preferred embodiment, receptacle 22 is made of the thermoplastic polyester, "VALOX", which is a trademark of General Electric Co. for a polybutylene terepthalate plastic. However, a nylon material, such as thermoplastic polyamide type 6/6, is also suitable as well as a wide variety of other materials, provided the material is compatible with its surroundings. For example, when the material is used in the hermetic shell of a refrigeration compressor, it should resist deterioration when exposed to refrigerant, oil, and temperatures up to approximately 300° F.

Figure 2:
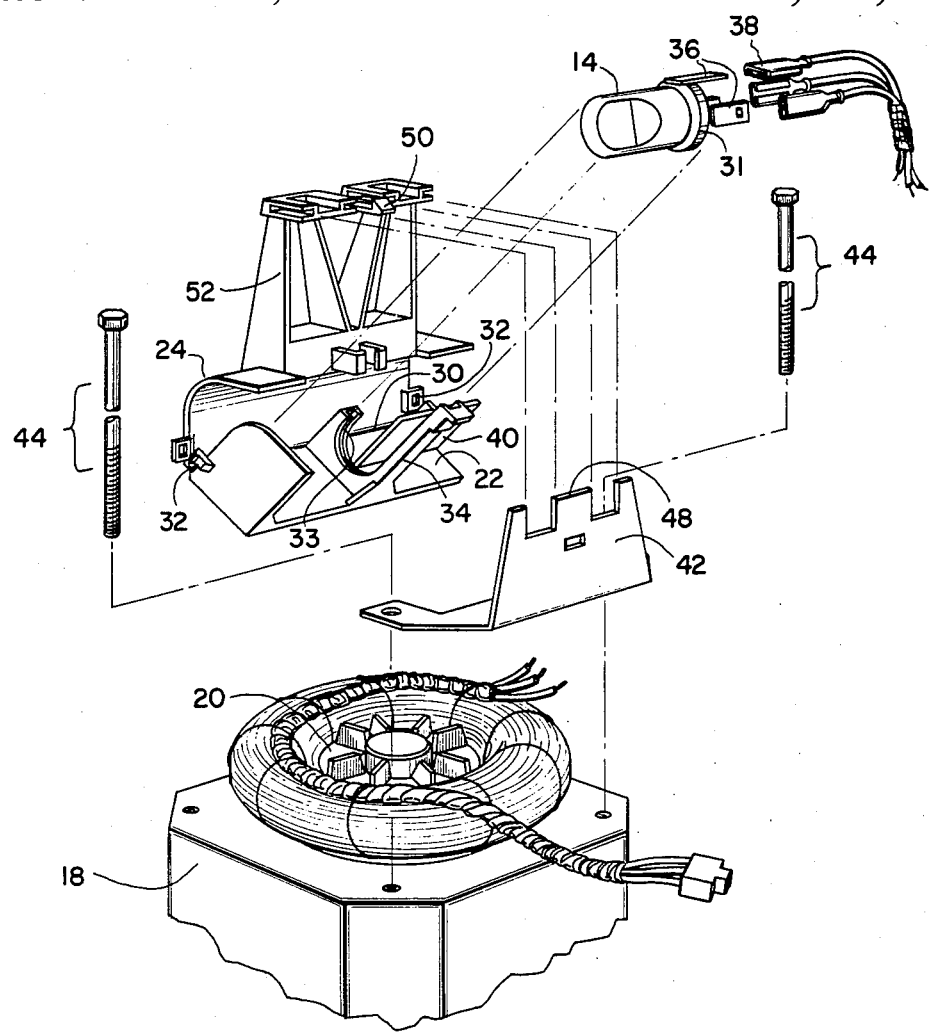
FIG. 2 is an exploded view of the receptacle shown in FIG. 1.

The exploded view of FIG. 2 further illustrates the unique features of receptacle 22, such as its integral hinge 30 that serves two functions. One function is to facilitate the manufacturing of receptacle 22 as a unitary piece by a plastic injection molding process. By forming receptacle 22 pivotally hinged in an open position, the receptacle has no protrusions that interlock with its injection mold and thus is readily ejected from it. Hinge 30 also enables motor protector 14 to be easily inserted into receptacle 22 and subsequently allows the receptacle to close around overload protector 14 to shield it from any heat absorbing surroundings. Receptacle 22 is held in a closed position by several interlocking catches 32 integrally formed along edges of heat retaining shields 24.

Receptacle 22 is adapted to accept a variety of overload protectors having various shapes and responsiveness, e.g., responsive primarily to current or primarily to temperature. Overload protector 14 is securely held in place by an outwardly extending U-shaped bracket 34 integrally disposed inside receptacle 22. A peripheral ridge 31 of protector 14 slidingly engages a U-shaped groove 33 which runs along the inner edge of bracket 34. Electrical terminals 36, on protector 14, extend toward an open side of the receptacle for connection to wire leads 38 extending from the stator windings, and/or power source depending on the specific motor being protected. Any uninsulated portions of the wire connections at terminals 36 are separated by insulating divider 40 which also functions, in conjunction with terminals 36, to prevent improper rotational positioning of protector 14 within receptacle 22.

Receptacle 22, with its overload protector 14, is attached to stator 18 by a sheet metal bracket 42. Bracket 42 is fastened to the top of stator 18 by stator bolts 44 which also extend down through the stator to further fasten a compressor 46 to the underside of stator 18. Bracket 42 includes a metal tab 48 that engages a latch 50 on a cantilever arm 52 which extends from receptacle 22. Latch 50 is disposed at the end of arm 52 so that, when engaged with bracket 42, arm 52 suspends receptacle 22 over the axial end of rotor 20. An opening 54 provides a fluid passage through receptacle 22 which places overload protector 14 in direct fluid communication with the heat source, e.g., rotor 20 and stator 18. Heated refrigerant gas rises through opening 54 and is trapped around overload protector 14 by heat retaining shields 24. This arrangement reduces the importance of an accurate fit between overload protector 14 and the heat source. As a result, the degree of protection afforded each compressor assembled is maintained at a relatively consistent high level independent of human error.

Although metal bracket 42 is used in the preferred embodiment, it should be appreciated by those skilled in the art that receptacle 22 can be modified to mount directly to stator 18, or other part of compressor 46, thereby eliminating bracket 42.

Figure 4:
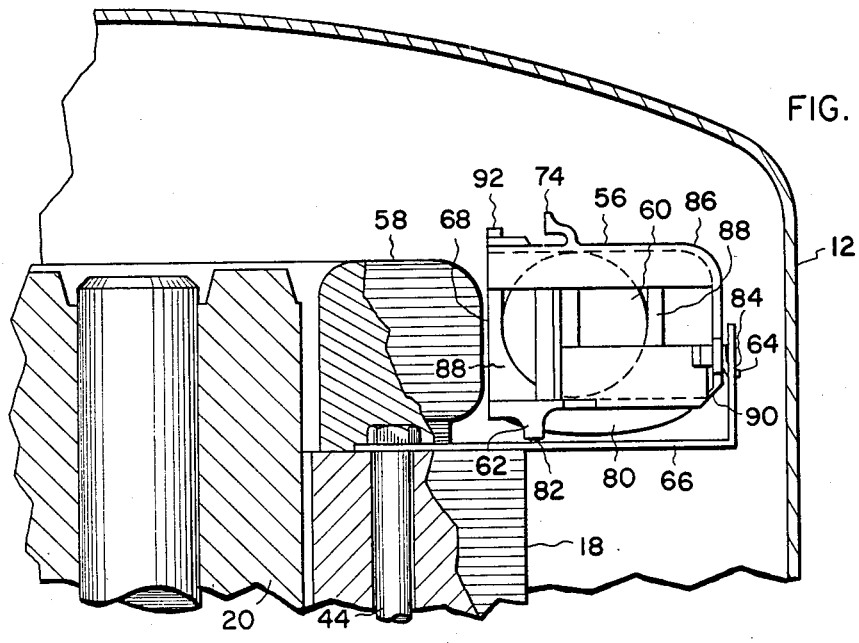
FIG. 4 is a cutaway view of the receptacle mounted with its opening facing perpendicular to the rotational axis of the rotor.
Figure 3:
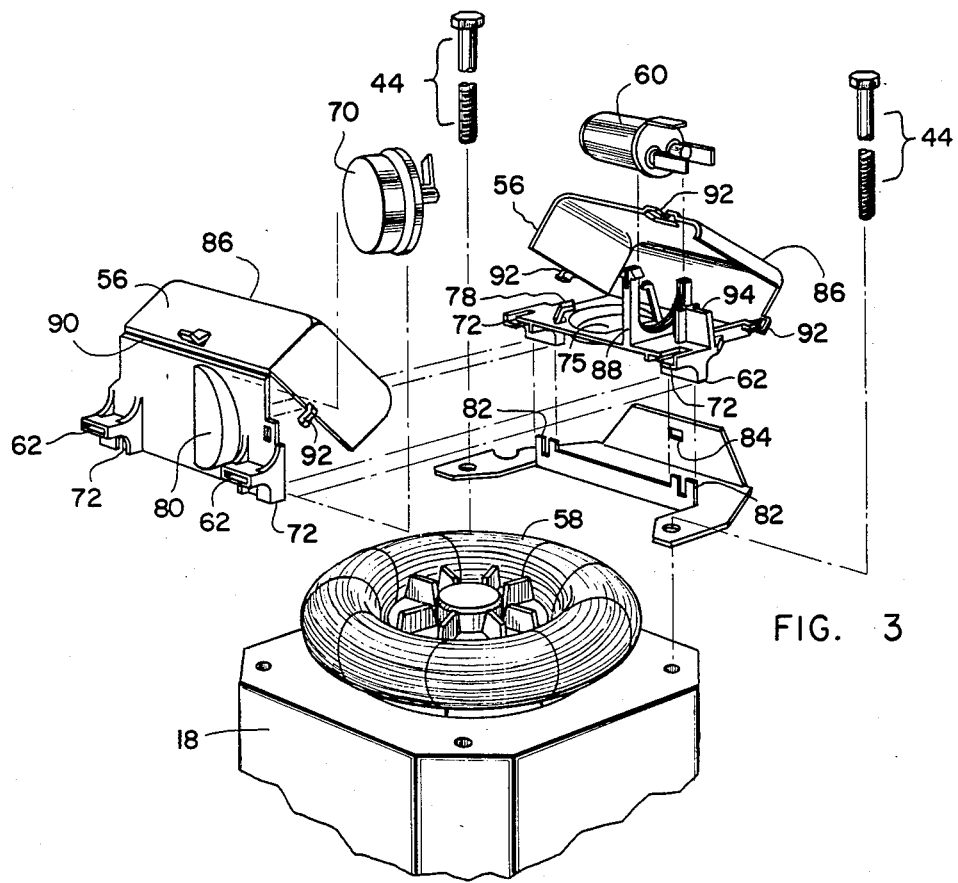
FIG. 3 is an exploded view of a second embodiment of the invention.

In some refrigeration compressors there is insufficient clearance to position an overload protector and its receptacle over the axial end of the rotor. Therefore, in a second embodiment of the invention, shown in FIG. 3, cantilever arm 52 is eliminated, and receptacle 56 is selectively positioned adjacent to end turns 58 of stator 18 in one of two configurations. When a cylindrically shaped overload protector 60 is installed, receptacle 56 is mounted in the configuration shown in FIG. 4. Tabs 62 and 64 engage a sheet metal bracket 66 at points 82 and 84 respectively, and an opening 68 of receptacle 56 faces toward the periphery of stator end turns 58, in a direction perpendicular to the rotational axis of rotor 20.

Figure 5:
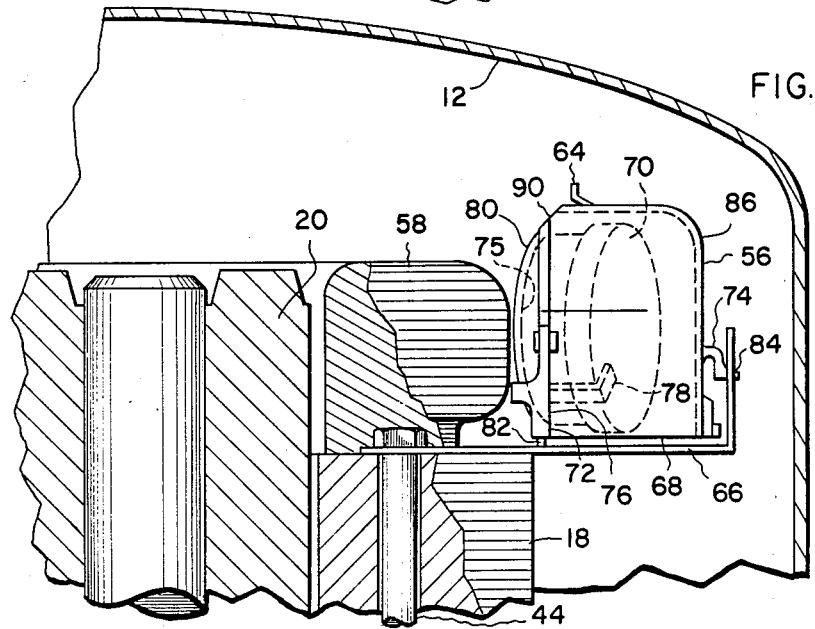
FIG. 5 is a cutaway view of the receptacle mounted with its opening facing parallel to the rotational axis of the rotor.

However, when using a disc-shaped protector, such as overload protector 70, receptacle 56 is turned around and mounted in the configuration shown in FIG. 5. Tabs 72 and 74 engage bracket 66 at points 82 and 84 respectively, and opening 68 faces downward in a direction parallel to the rotational axis of rotor 20. Overload protector 70 fits into a recessed cavity 75 formed on the interior of side 76 and is held in place by clips 78. Cavity 75 creates a protrusion 80 on the exterior of receptacle 56 which places overload protector 70 in close heat exchange relationship with the periphery of stator end turns 58.

In the second embodiment, it should be noted that a heat retaining shield 86, a U-shaped bracket 88, an integral hinge 90, catches 92, and insulating divider 94 are all generally equivalent in function to corresponding components of the first embodiment, i.e., heat retaining shield 24, bracket 34, integral hinge 30, catches 32, and insulating divider 40 respectively.

Although the invention is described with respect to more than one embodiment, further modifications thereto will be apparent to those skilled in the art. Therefore, the scope of the invention is to be determined by reference to the claims which follow.

We claim:

1. A device for mounting a heat responsive overload protector near a heat source, said mounting device comprising a receptacle having a heat retaining shield and adapted to hold said overload protector between said heat source and said shield such that one side of said overload protector faces toward said heat source in heat exchange relationship therewith, and an opposite side of said overload protector faces away from said heat source and toward said heat retaining shield so that said shield helps prevent heat loss from said protector, said receptacle also having an opening for providing a fluid passage directly between said heat source and said overload protector.

2. The mounting device as recited in claim 1, wherein said overload protector is mounted in a motor driven compressor used to compress a fluid, and wherein said heat retaining shield is spaced apart from said overload protector to define a space therebetween for trapping fluid heated by the motor around said overload protector.

3. The mounting device as recited in claim 1, wherein said overload protector is mounted in a compressor used to compress a fluid and driven by an electric motor having a rotor, and wherein said receptacle is adapted to be selectively mounted in one of two configurations, such that in one configuration, said opening faces in a direction generally perpendicular to the rotational axis of said rotor, and in an other configuration, said opening faces in a direction generally parallel to the rotational axis of said rotor.

4. The mounting device as recited in claim 1, wherein said heat source is an electric motor and said receptacle is adapted to hold said overload protector in a position spaced apart from said motor.

5. The mounting device as recited in claim 4, wherein said receptacle includes a cantilever arm that positions said overload protector over an axial end of a rotor of said electric motor.

6. The mounting device as recited in claim 1, wherein said receptacle includes an integral hinge that enables said receptacle to be opened for inserting said overload protector therein.

7. The mounting device as recited in claim 1, wherein said receptacle includes an integral U-shaped bracket adapted to hold said overload protector in place.

8. The mounting device as recited in claim 1, wherein said receptacle includes a recessed cavity adapted to receive said overload protector.

9. A device for mounting a heat responsive overload protector within a hermetic shell of a motor driven compressor used for compressing a fluid, said mounting device comprising a receptacle disposed within said shell and including a heat retaining shield, said receptacle adapted to hold said overload protector between said compressor motor and said shield with one side of said overload protector facing toward said compressor motor in heat exchange relationship therewith, and an opposite side of said overload protector facing toward but spaced apart from said heat retaining shield so that said shield helps trap fluid heated by said motor around said protector and helps prevent heat loss from said protector, said receptacle also having an opening for providing a fluid passage directly between said heat source and said overload projector.

10. The mounting device as recited in claim 1, wherein said receptacle is adapted to be selectively mounted in one of two configurations, such that in one configuration, said opening faces in a direction generally perpendicular to the rotational axis of a rotor of said compressor motor, and in an other configuration, said opening faces in a direction generally parallel to the rotational axis of said rotor.

11. The mounting device as recited in claim 9, wherein said receptacle is adapted to hold said overload protector in a position spaced apart from said compressor motor.

12. The mounting device as recited in claim 9, wherein said receptacle includes a cantilever arm that positions said overload protector over an axial end of a rotor of said compressor motor.

13. The mounting device as recited in claim 9, wherein said receptacle includes an integral hinge that enables said receptacle to be opened for inserting said overload protector therein.

14. The mounting device as recited in claim 9, wherein said receptacle includes an integral U-shaped bracket for holding said overload protector in place.

15. The mounting device as recited in claim 9, wherein said receptacle includes a recessed cavity adapted to receive said overload protector.

16. A method of protecting a hermetic compressor driven by a motor and used to compress a fluid, comprising the steps of:
 a. mounting a temperature sensitive overload protector adjacent to and spaced apart from said motor;
 b. impeding heat loss from said protector by positioning a heat retaining shield adjacent to and spaced apart from said protector;
 c. heating said fluid with said motor;
 d. trapping the heated fluid between said overload protector and said heat retaining shield;
 e. sensing the temperature of said heated fluid with said overload protector; and
 f. de-energizing said motor in response to the temperature of said heated fluid exceeding a predetermined limit.

17. The method as recited in claim 16 further comprising the step of providing a fluid passage directly between said motor and the side of said protector that is closest to said motor.

18. The method as recited in claim 16 wherein in the step of mounting said overload protector, said protector is selectively mounted in one of two configurations, such that in one configuration, heat is radiated from said motor to said protector in a direction generally perpendicular to the rotational axis of a rotor of said motor, and in an other configuration, heat is radiated from said motor to said protector in a direction generally parallel to the rotational axis of said rotor.

19. The method as recited in claim 16 wherein in the step of mounting said overload protector, said protector is positioned over the axial end of a rotor of said motor.

* * * * *